(12) United States Patent
Chauvenet

(10) Patent No.: US 10,978,985 B2
(45) Date of Patent: Apr. 13, 2021

(54) CONTROL DEVICE FOR AN INVERTER

(71) Applicant: VALEO SYSTEMES DE CONTROLE MOTEUR, Cergy Saint Christophe (FR)

(72) Inventor: Pierre-Alexandre Chauvenet, Cergy (FR)

(73) Assignee: VALEO SIEMENS EAUTOMOTIVE FRANCE SAS, Cergy (FR)

( * ) Notice: Subject to any disclaimer, the term of this patent is extended or adjusted under 35 U.S.C. 154(b) by 53 days.

(21) Appl. No.: 15/998,901

(22) PCT Filed: Feb. 14, 2017

(86) PCT No.: PCT/EP2017/053291
§ 371 (c)(1),
(2) Date: Aug. 16, 2018

(87) PCT Pub. No.: WO2017/140676
PCT Pub. Date: Aug. 24, 2017

(65) Prior Publication Data
US 2020/0067444 A1 Feb. 27, 2020

(30) Foreign Application Priority Data
Feb. 17, 2016 (FR) ...................................... 16 51265

(51) Int. Cl.
*H02P 27/12* (2006.01)
*H02P 21/30* (2016.01)
*H02P 21/00* (2016.01)

(52) U.S. Cl.
CPC .......... *H02P 27/12* (2013.01); *H02P 21/0025* (2013.01); *H02P 21/30* (2016.02)

(58) Field of Classification Search
None
See application file for complete search history.

(56) References Cited

U.S. PATENT DOCUMENTS 5,552,977 A * 9/1996 Xu ................... H02M 7/53875
318/811
9,130,482 B2 * 9/2015 Zhao .................. H02M 7/5395
(Continued)

FOREIGN PATENT DOCUMENTS

EP 2 790 315 A1 10/2014
EP 2 887 539 A2 6/2015

OTHER PUBLICATIONS

International Search Report for Application No. PCT/EP2017/053291 dated Apr. 24, 2017.
(Continued)

*Primary Examiner* — Bickey Dhakal
(74) *Attorney, Agent, or Firm* — McCormick, Paulding & Huber PLLC

(57) ABSTRACT

The control device includes: a unit for receiving, for a time period, phase voltage setpoints forming a setpoint vector in vector space; a unit for selecting at least N+1 states of the inverter which are associated, respectively, with at least N+1 predetermined vectors (M1 . . . M27) defining a volume in the vector space (Esp) containing the setpoint vector; a unit for controlling the inverter, over the time period, in order to place it successively in the selected states so that it substantially applies, on average over the time period, the phase voltage setpoints. The at least N+1 states of the inverter are selected from among groups of at least N+1 states of the inverter, the at least N+1 states of the inverter of at least one of the groups being associated, respectively, with at least N+1 predetermined vectors (M1 . . . M27), at least N of which are formed by predetermined zero-sum phase voltages and at least one of which is formed by predetermined nonzero-sum phase voltages.

20 Claims, 2 Drawing Sheets

(56) References Cited

U.S. PATENT DOCUMENTS 10,425,017 B2 * 9/2019 Qian .................. H02M 7/5387
2014/0306627 A1 * 10/2014 Bruyere ............. H02P 21/0021
   318/400.15
2018/0331644 A1 * 11/2018 El Khamlichi Drissi ..................
   H02P 21/22

OTHER PUBLICATIONS

Paul Sandulescu: "Modelisation et commande d'unsys eme a trois phases independante a double fonctionnalite—Tractio Electrique et Chargeur Forte Puissance pour application automobile", Sep. 6, 2013 (Sep. 6, 2013), pp. 1-194, XP055313543, Retrieved from the Internet:URL:https://pastel.archives-ouvertes.fr/pastel-00912564 [retrieved on Oct. 25, 2016] cited in the application p. 120-p. 133.

* cited by examiner

CONTROL DEVICE FOR AN INVERTER

CROSS REFERENCE TO RELATED APPLICATION

This application is a National Stage application of International Patent Application No. PCT/EP2017/053291, filed on Feb. 14, 2017, which claims priority to French Patent Application No. 1651265, filed on Feb. 17, 2016, each of which is hereby incorporated by reference in its entirety.

TECHNICAL FIELD

This invention concerns the control of electrical engines.

BACKGROUND

Paul Sandulescu's thesis, entitled "Modelling and control of a system with three independent, dual-function phases: Electrical Traction and High Power Charger for automobile application" defended on 6 Sep. 2013 at the ParisTech School of Arts and Business, describes a control device for an inverter configured to be connected to a triphase engine, respectively configured to receive three phase voltages, with the three phase voltages defining a vector space of which each phase voltage is one dimension. The inverter is designed to support several statuses in each of which it is designed to apply predetermined phase voltages to the engine phases, with the predetermined phase voltages for each status of the inverter forming a predetermined vector in the vector space.

Two control methods have been described.

In the first control method, namely Z-SVM Vector MLI, the control device is configured to put the inverter only in statuses associated with predetermined vectors, each formed from predetermined phase voltages, the sum of which is zero (i.e. non-homopolar). In using such predetermined vectors, this first control method ensures that the phase voltages do not present any homopolar component. However, it is not possible to apply a homopolar component to the engine.

In the second control method, namely 3-Level Intersective MLI, all vectors that can be obtained from the inverter statuses can be used. There are 27 of such vectors. According to this control method, four of these vectors are used for a predetermined length of time (known as an MLI period): these are four vectors that form a tetrahedron containing the setpoint vector. This second control method is more flexible than the first, since it allows a homopolar component to be applied to the engine, which is sometimes useful. However, a parasitic homopolar component may, nevertheless be applied to the engine when the setpoint is not homopolar.

The aim of the invention is to propose a control device for an inverter that allows the above disadvantages to be mitigated at least partially.

SUMMARY

To this end, a control device for an inverter that is configured to be connected to an engine with N phases, configured to respectively receive N phase voltages, with the N phase voltages defining a vector space, of which each phase voltage forms a dimension, with N being greater than or equal to three and the inverter designed to support several statuses in each of which it is designed to apply predetermined phase voltages to the engine phases, with the predetermined phase voltages of each status of the inverter forming a predetermined vector in the vector space has been proposed, with the control device comprising the following:
- a unit to receive the phase voltage setpoints that form a setpoint vector in the vector space, for a period of time,
- a unit to select at least N+1 statuses of the inverter respectively associated with at least N+1 predetermined vectors that define a volume in the vector space containing the setpoint vector,
- a unit to control the inverter, over the period of time, to place it successively in the statuses selected, so that it substantially applies the phase voltage setpoints on average over the period of time,
the control device wherein at least N+1 statuses of the inverter are selected from among the groups of at least N+1 statuses of the inverter, the at least N+1 inverter statuses for at least one of the groups being respectively associated with at least N+1 predetermined vectors of which at least N are formed by predetermined phase voltages with a zero sum and at least one of which is formed by predetermined phase voltages with a non-zero sum.

In the vector space, the non-homopolar vectors (formed by zero sum phase voltages) are all placed in a plan, known as a Concordia plan. Thanks to the invention, when the setpoint vector does not comprise a homopolar component, it can be created with the N predetermined vectors formed from the predetermined zero sum phase voltages, since these at least N predetermined vectors delimit a part of the Concordia plan. Therefore, since no predetermined homopolar vector has been used to generate the setpoint vector, the risk of applying a parasitic homopolar component to the engine is reduced. Moreover, the presence of at least one predetermined homopolar vector (i.e. one formed from predetermined non-zero sum phase voltages) allows a setpoint vector with a homopolar component to be generated, where necessary.

Optionally, each group comprises an inverter status associated with a zero vector in the vector space for which the predetermined phase voltages are all zero.

Optionally again, the volumes defined by the predetermined vectors associated with the groups of statuses of the inverter do not overlap.

Optionally again, each inverter status group comprises exactly N+1 inverter statuses.

Optionally again, at least one inverter status group comprises exactly N−1 statuses respectively associated with N−1 predetermined vectors each formed from the predetermined zero sum phase voltages.

Optionally again, N is three.

An electric installation comprising the following is also proposed:
- an inverter to be connected to an engine with N phases configured to receive N phase voltages, with the N phase voltages defining a vector space of which each phase voltage forms a dimension, with N being greater than or equal to three and the inverter being designed to support several statuses in each of which it is designed to apply the predetermined phase voltages to the engine phases, with the predetermined phase voltages of each inverter status forming a predetermined vector in the vector space,
- a control device for the inverter, according to the invention.

Optionally, the inverter comprises the following:
- a first terminal and a second terminal between which a continuous voltage is to be applied,
- a switching arm for each end of phase, comprising two switches connected to each other at a midpoint to which the end of phase considered is to be connected, with a first switch being connected to the first terminal and the second switch being connected to the second terminal, with each switch designed to support an open status and a closed status, and each status of the inverter defined by a combination of switch statuses.

A control procedure for an inverter that is configured to be connected to an engine with N phases, configured to respectively receive N phase voltages, with the N phase voltages defining a vector space, of which each phase voltage forms a dimension, with N being greater than or equal to three and the inverter designed to support several statuses in each of which it is designed to apply predetermined phase voltages to the engine phases, with the predetermined phase voltages of each status of the inverter forming a predetermined vector in the vector space has also been proposed, with the control procedure comprising the following:

receiving the phase voltage setpoints that form a setpoint vector in the vector space for a period of time, selecting at least N+1 statuses of the inverter respectively associated with at least N+1 predetermined vectors that define a volume in the vector space containing the setpoint vector, controlling the inverter, over the period of time, to place it successively in the statuses selected, so that it substantially applies the phase voltage setpoints on average over the period of time, the control procedure being wherein at least N+1 statuses of the inverter are selected from among the groups of at least N+1 statuses of the inverter, the at least N+1 statuses of the inverter for at least one of the groups being respectively associated with at least N+1 predetermined vectors of which at least N are formed by predetermined phase voltages with a zero sum and at least one of which is formed by predetermined phase voltages with a non-zero sum.

A computer program that can be downloaded from a communication network and/or recorded on a data carrier that can be read by a computer, wherein it comprises of the instructions for the implementation of the steps for a procedure according to the invention, when the computer programme is run by a computer, is also proposed.

DETAILED DESCRIPTION

Figure 1:
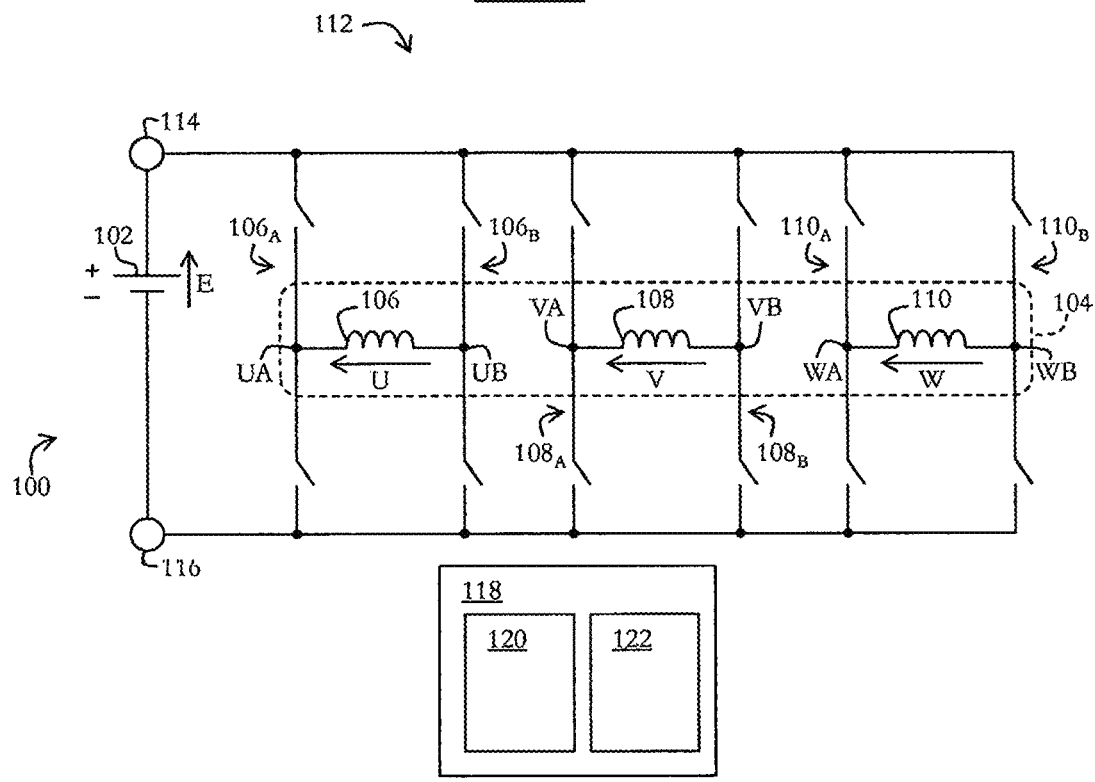
FIG. 1 is an electrical diagram for an electrical installation that implements the invention.

An electrical installation 100, which is an embodiment of the invention, shall now be described with reference to FIG. 1.

This electrical installation 100, is designed to be installed in a motor vehicle, for example.

First of all, the electrical installation 100 comprises a battery 102, with a negative terminal − and a positive terminal + that supplies direct voltage E between these terminals. The negative terminal − of the battery 102 is generally connected to an electrical ground point, e.g. the chassis of a motor vehicle.

Furthermore, the electrical installation 100 comprises an electric engine 104 with a rotor (not shown) designed to rotate relative to a stator (not shown) e.g. to drive the wheels of the motor vehicle. The electrical engine 104 comprises three phases 106, 108 and 110 formed from induction coils. The three phases 106, 108 and 110 each have two ends, between which phase voltages U, V and W are configured to be applied. The phases 106, 108 and 110 are stator phases of the electric engine 104, for example. The electric engine 104 is an asynchronous engine, for example.

The electrical installation 100 also comprises an inverter 112 that connects the battery 102 to the electric engine 104.

More specifically, the inverter 112 comprises two terminals 114 and 116, which, in the example described, are connected to the positive terminal + and the negative terminal − of the battery 102, respectively.

The inverter 112 also comprises a switching arm 106A, 106B, 108A, 108B, 110A, 110B for each end of phase, comprising two switches connected to each other at a midpoint UA, UB, VA, VB, WA, WB to which the end of the phase concerned is connected. Of the two switches, a first switch, called the top switch, is connected to the first terminal 114, whereas the second switch, called the bottom switch, is connected to the second terminal 116. Each switch comprises, for example, a transistor, such as a Metal Oxide Semiconductor Field Effect Transistor or MOSFET or a IGBT (Insulated Gate Bipolar Transistor) with a diode (not shown) in an antiparallel circuit. Each switch is configured to selectively support an open status and a closed status. Therefore, the top switch is configured to selectively connect/disconnect the end of phase considered to/from the first terminal 114, and therefore to/from the positive terminal + of the battery 102 for each end of phase. Likewise, the bottom switch is configured to selectively connect/disconnect the end of phase considered to/from the bottom terminal 116, and therefore to/from the negative terminal − of the battery 102. The inverter 112 is therefore designed to apply to each one of the two predetermined potentials +E and 0 end of phase, based on the statuses of the two switches associated with the end of phase concerned.

The inverter 112 is thus designed to apply one of the three predetermined phase voltages +E, 0 and −E to each phase 106, 108 and 110, based on the statuses of the four switches associated with the two ends of phase of the phase 106, 108, 110 considered. More specifically, the voltage +E is obtained with the potential +E at the first end and the potential 0 at the second end. The voltage 0 is, obtained with the potential +E at both ends or with potential 0 at both ends. The voltage −E is obtained with the potential 0 at the first end and the potential +E at the second end.

Each switch status combination defines a status of the inverter 112 in which it applies, to each phase 106, 108 and 110 of the electric engine 104, a predetermined phase voltage of +E, 0 or −E. It shall be noted that the statuses of the inverter 112 are discrete statuses.

All the predetermined phase voltages shall be expressed in a standardised manner in the rest of the description. Thus, each predetermined phase voltage is +1, 0 or −1.

It should be noted that several statuses of the inverter 112 may be associated with the same predetermined phase voltages.

Moreover, the top switch and the bottom switch of each switching arm have the opposite statuses in each switch status combination.

Figure 2:
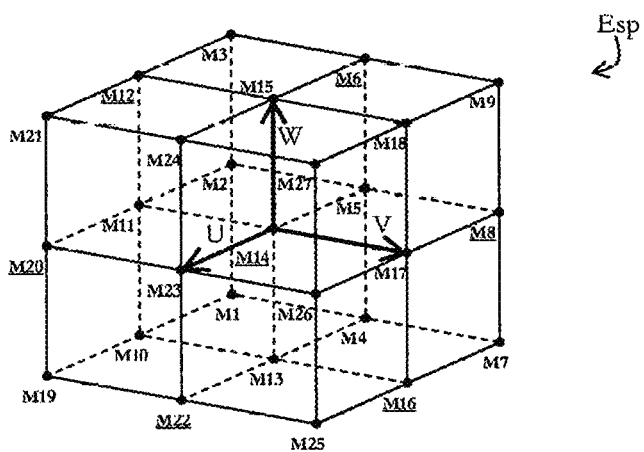
FIG. 2 is a view of the phase voltages in the vector space, with the possibility to apply the predetermined phase voltages using an inverter from the electrical installation of FIG. 1.

With reference to FIG. 2, it is possible to associate a predetermined vector M1-M27 with the predetermined phase voltages of each status of the inverter 112 in the vector space Esp of the phase voltages U, V and W. These predetermined phase voltages form the coordinates of the vector M1-M27. Predetermined vectors M1-M27 form a regular cube-shaped mesh in the vector space Esp.

Returning to FIG. 1, the electrical installation 100 further comprises a control device 118 for the inverter 112.

The control device 118 first of all comprises a memory 120.

The groups T1-T48 of four predetermined vectors M1-M27 are saved in the memory 120. These groups T1-T48 are given in Table 1 below, in which the indices for the predetermined vectors M1-M27 are given between brackets:

TABLE 1

T1 = [14 15 18 24]
T2 = [14 18 27 24]
T3 = [14 23 24 26]
T4 = [14 24 27 26]
T5 = [14 17 26 18]
T6 = [14 26 27 18]
T7 = [14 15 12 21]
T8 = [14 15 24 21]
T9 = [14 11 12 20]
T10 = [14 12 21 20]
T11 = [14 23 20 21]
T12 = [14 23 24 21]
T13 = [14 15 12 6]
T14 = [14 12 3 6]
T15 = [14 5 6 3]
T16 = [14 5 2 3]
T17 = [14 11 2 3]
T18 = [14 11 12 3]
T19 = [14 15 18 9]
T20 = [14 15 6 9]
T21 = [14 17 18 9]
T22 = [14 17 8 9]
T23 = [14 8 9 6]
T24 = [14 5 6 8]
T25 = [14 13 16 22]
T26 = [14 22 25 16]
T27 = [14 23 22 25]
T28 = [14 23 26 25]
T29 = [14 17 26 25]
T30 = [14 17 16 25]
T31 = [14 13 10 19]
T32 = [14 13 22 19]
T33 = [14 11 10 19]
T34 = [14 11 20 19]
T35 = [14 20 19 22]
T36 = [14 23 20 22]

TABLE 1-continued

T37 = [14 13 4 10]
T38 = [14 4 1 10]
T39 = [14 5 2 4]
T40 = [14 2 1 4]
T41 = [14 2 1 10]
T42 = [14 10 11 2]
T43 = [14 13 16 7]
T44 = [14 13 4 7]
T45 = [14 17 8 16]
T46 = [14 8 7 16]
T47 = [14 5 8 7]
T48 = [14 5 4 7]

It shall be noted that each group T1-T48 comprises the original vector M14=(0, 0, 0) formed by the predetermined zero phase voltages. Moreover, the predetermined vectors M1-M27 for each group T1-T48 define a volume (more specifically, a tetrahedron) in the vector space Esp. The volumes thus defined do not overlap, or at the most touch each other via a common stop or a common face.

It shall also be noted that each of the groups T9, T10, T13, T14, T23, T24, T25, T26, T35, T36, T45 and T46 comprise exactly three predetermined vectors, including the original vector M14, the sum of the predetermined phase voltages for each of which is zero. These are therefore non-homopolar phase voltages. The corresponding predetermined vectors, given in bold on Table 1, shall be called "non-homopolar vectors" hereafter. Each of these groups T9, T10, T13, T14, T23, T24, T25, T26, T35, T36, T45 and T46 further comprise exactly one vector for which the sum of the predetermined phase voltages is not zero. These are therefore homopolar phase voltages. The corresponding predetermined vectors shall be called "homopolar vectors" hereafter.

It shall also be noted that each of the groups T7, T11, T15, T18, T20, T22, T26, T30, T32, T34, T43 and T47 comprise exactly two non-homopolar vectors, including the original vector M14, and exactly two homopolar vectors.

The other groups T1, T2, T3, T4, T5, T6, T8, T12, T16, T17, T19, T21, T28, T29, T31, T33, T37, T38, T39, T40, T41, T42, T44 and T48 comprise exactly three homopolar vectors in addition to the original vector M14, which is non homopolar.

Each predetermined vector M1-M27 is further associated in the memory 120, with the status or statuses of the inverter 112 associated with said predetermined vector M1-M27. Each status of the inverter 112 is for example represented by the statuses of the top switches and the bottom switches. Therefore, the associations recorded in the memory 112 are those given in the Table 2 below, for example, where the columns show the statuses of the top and bottom switches of the switching arm 106A, 106B, 108A, 108B, 110A and 110B, with 0 representing an open switch and 1 representing a closed switch, and in which the ID column gives the status number:

TABLE 2

| | 106A | | 106B | | 108A | | 108B | | 110A | | 110B | | |
|---|---|---|---|---|---|---|---|---|---|---|---|---|---|
| | High | Low | High | Low | High | Low | High | Low | High | Low | High | Low | ID |
| M1 | 0 | 1 | 1 | 0 | 0 | 1 | 1 | 0 | 0 | 1 | 1 | 0 | 1 |
| M2 | 0 | 1 | 1 | 0 | 0 | 1 | 1 | 0 | 0 | 1 | 0 | 1 | 2 |
| — | 0 | 1 | 1 | 0 | 0 | 1 | 1 | 0 | 1 | 0 | 1 | 0 | 3 |
| M3 | 0 | 1 | 1 | 0 | 0 | 1 | 1 | 0 | 1 | 0 | 0 | 1 | 4 |
| M4 | 0 | 1 | 1 | 0 | 0 | 1 | 0 | 1 | 0 | 1 | 1 | 0 | 5 |
| — | 0 | 1 | 1 | 0 | 0 | 1 | 0 | 1 | 0 | 1 | 1 | 0 | 6 |
| M5 | 0 | 1 | 1 | 0 | 0 | 1 | 0 | 1 | 0 | 1 | 0 | 1 | 7 |
| — | 0 | 1 | 1 | 0 | 0 | 1 | 0 | 1 | 1 | 0 | 1 | 0 | 8 |
| — | 0 | 1 | 1 | 0 | 0 | 1 | 0 | 1 | 0 | 1 | 0 | 1 | 9 |
| — | 0 | 1 | 1 | 0 | 0 | 1 | 0 | 1 | 0 | 1 | 1 | 0 | 10 |

TABLE 2-continued

|  | 106A | | 106B | | 108A | | 108B | | 110A | | 110B | | |
| --- | --- | --- | --- | --- | --- | --- | --- | --- | --- | --- | --- | --- | --- |
|  | High | Low | High | Low | High | Low | High | Low | High | Low | High | Low | ID |
| M6  | 0 | 1 | 1 | 0 | 0 | 1 | 0 | 1 | 1 | 0 | 0 | 1 | 11 |
| —   | 0 | 1 | 1 | 0 | 1 | 0 | 1 | 0 | 1 | 0 | 0 | 1 | 12 |
| M7  | 0 | 1 | 1 | 0 | 1 | 0 | 0 | 1 | 0 | 1 | 1 | 0 | 13 |
| M8  | 0 | 1 | 1 | 0 | 1 | 0 | 0 | 1 | 0 | 1 | 0 | 1 | 14 |
| —   | 0 | 1 | 1 | 0 | 1 | 0 | 0 | 1 | 1 | 0 | 1 | 0 | 15 |
| M9  | 0 | 1 | 1 | 0 | 1 | 0 | 0 | 1 | 1 | 0 | 0 | 1 | 16 |
| M10 | 0 | 1 | 0 | 1 | 0 | 1 | 1 | 0 | 0 | 1 | 1 | 0 | 17 |
| —   | 1 | 0 | 1 | 0 | 0 | 1 | 1 | 0 | 0 | 1 | 1 | 0 | 18 |
| M11 | 0 | 1 | 0 | 1 | 0 | 1 | 1 | 0 | 0 | 1 | 0 | 1 | 19 |
| —   | 0 | 1 | 0 | 1 | 0 | 1 | 1 | 0 | 1 | 0 | 1 | 0 | 20 |
| —   | 1 | 0 | 1 | 0 | 0 | 1 | 1 | 0 | 0 | 1 | 0 | 1 | 21 |
| —   | 1 | 0 | 1 | 0 | 0 | 1 | 1 | 0 | 1 | 0 | 1 | 0 | 22 |
| M12 | 0 | 1 | 0 | 1 | 0 | 1 | 1 | 0 | 1 | 0 | 0 | 1 | 23 |
| —   | 1 | 0 | 1 | 0 | 0 | 1 | 1 | 0 | 1 | 0 | 0 | 1 | 24 |
| M13 | 0 | 1 | 0 | 1 | 0 | 1 | 0 | 1 | 0 | 1 | 1 | 0 | 25 |
| —   | 0 | 1 | 0 | 1 | 1 | 0 | 1 | 0 | 0 | 1 | 1 | 0 | 26 |
| —   | 1 | 0 | 1 | 0 | 0 | 1 | 0 | 1 | 0 | 1 | 1 | 0 | 27 |
| —   | 1 | 0 | 1 | 0 | 1 | 0 | 1 | 0 | 0 | 1 | 1 | 0 | 28 |
| M14 | 0 | 1 | 0 | 1 | 0 | 1 | 0 | 1 | 0 | 1 | 0 | 1 | 29 |
| —   | 0 | 1 | 0 | 1 | 0 | 1 | 0 | 1 | 1 | 0 | 1 | 0 | 30 |
| —   | 0 | 1 | 0 | 1 | 1 | 0 | 1 | 0 | 0 | 1 | 0 | 1 | 31 |
| —   | 0 | 1 | 0 | 1 | 1 | 0 | 1 | 0 | 1 | 0 | 1 | 0 | 32 |
| —   | 1 | 0 | 1 | 0 | 0 | 1 | 0 | 1 | 0 | 1 | 0 | 1 | 33 |
| —   | 1 | 0 | 1 | 0 | 0 | 1 | 0 | 1 | 1 | 0 | 1 | 0 | 34 |
| —   | 1 | 0 | 1 | 0 | 1 | 0 | 1 | 0 | 0 | 1 | 0 | 1 | 35 |
| —   | 1 | 0 | 1 | 0 | 1 | 0 | 1 | 0 | 1 | 0 | 1 | 0 | 36 |
| M15 | 0 | 1 | 0 | 1 | 0 | 1 | 0 | 1 | 1 | 0 | 0 | 1 | 37 |
| —   | 0 | 1 | 0 | 1 | 1 | 0 | 1 | 0 | 1 | 0 | 0 | 1 | 38 |
| —   | 1 | 0 | 1 | 0 | 0 | 1 | 0 | 1 | 1 | 0 | 0 | 1 | 39 |
| —   | 1 | 0 | 1 | 0 | 1 | 0 | 1 | 0 | 1 | 0 | 0 | 1 | 40 |
| M1  | 0 | 1 | 0 | 1 | 1 | 0 | 0 | 1 | 0 | 1 | 1 | 0 | 41 |
| —   | 1 | 0 | 1 | 0 | 1 | 0 | 0 | 1 | 0 | 1 | 1 | 0 | 4 |
| M17 | 0 | 1 | 0 | 1 | 1 | 0 | 0 | 1 | 0 | 1 | 0 | 1 | 4 |
| —   | 0 | 1 | 0 | 1 | 1 | 0 | 0 | 1 | 1 | 0 | 1 | 0 | 4 |
| —   | 1 | 0 | 1 | 0 | 1 | 0 | 0 | 1 | 0 | 1 | 0 | 1 | 4 |
| —   | 1 | 0 | 1 | 0 |   |   | 0 | 0 | 1 | 1 | 0 | 1 | 4 |
| M18 | 0 | 1 | 0 | 1 | 1 | 0 | 0 | 1 | 1 | 0 | 0 | 1 | 4 |
| —   | 0 | 1 | 0 | 1 | 1 | 0 | 0 | 1 | 1 | 0 | 0 | 1 | 4 |
| M19 | 1 | 0 | 0 | 1 | 0 | 1 | 1 | 0 | 0 | 1 | 1 | 0 | 4 |
| M20 | 1 | 0 | 0 | 1 | 0 | 1 | 1 | 0 | 0 | 1 | 0 | 1 | 5 |
| —   | 1 | 0 | 0 | 1 | 0 | 1 | 1 | 0 | 1 | 0 | 1 | 0 | 5 |
| M21 | 1 | 0 | 0 | 1 | 0 | 1 | 1 | 0 | 1 | 0 | 0 | 1 | 5 |
| M22 | 1 | 0 | 0 | 1 | 0 | 1 | 0 | 1 | 0 | 1 | 1 | 0 | 5 |
| —   | 1 | 0 | 0 | 1 | 1 | 0 | 1 | 0 | 0 | 1 | 1 | 0 | 5 |
| M23 | 1 | 0 | 0 | 1 | 0 | 1 | 0 | 1 | 0 | 1 | 0 | 1 | 5 |
| —   | 1 | 0 | 0 | 1 | 0 | 1 | 0 | 1 | 1 | 0 | 1 | 0 | 5 |
| —   | 1 | 0 | 0 | 1 | 1 | 0 | 1 | 0 | 0 | 1 | 0 | 1 | 5 |
| —   | 1 | 0 | 0 | 1 | 1 | 0 | 1 | 0 | 1 | 0 | 1 | 0 | 5 |
| M24 | 1 | 0 | 0 | 1 | 0 | 1 | 0 | 1 | 1 | 0 | 0 | 1 | 5 |
| —   | 1 | 0 | 0 | 1 | 1 | 0 | 1 | 0 | 1 | 0 | 0 | 1 | 6 |
| M25 | 1 | 0 | 0 | 1 | 1 | 0 | 0 | 1 | 0 | 1 | 1 | 0 | 6 |
| M26 | 1 | 0 | 0 | 1 | 1 | 0 | 0 | 1 | 0 | 1 | 0 | 1 | 6 |
| —   | 1 | 0 | 0 | 1 | 1 | 0 | 0 | 1 | 1 | 0 | 1 | 0 | 6 |
| M27 | 1 | 0 | 0 | 1 | 1 | 0 | 0 | 1 | 1 | 0 | 0 | 1 | 6 |

Thus, the predetermined vector groups T1-T48, and the associations between the predetermined vectors M1-M27 and the statuses of the inverter 112 together form groups of four statuses of the inverter 112 each associated with four predetermined vectors M1-M27. In particular, some groups of statuses of the inverter 112 comprise statuses of the inverter 112 that are respectively associated with four predetermined vectors M1-M27, three of which are non-homopolar and one of which is homopolar. These are groups of statuses of the inverter 112 that correspond to the predetermined vector groups T9, T10, T13, T14, T23, T24, T25, T26, T35, T36, T45 and T46.

The control device 118 further comprises a processing unit 122 designed to create the actions that shall be described later on, in the description of an operating procedure for the electrical installation 100. In the example described, the processing unit 122 is a computer that is configured to run a computer program to carry out these actions. Alternatively, the processing unit 122 could be a hardware component that does not use a computer program.

What is more, the term "combination of switch statuses" should be understood as a stable combination, in contrast with transitory combinations that result from slight shifts, sometimes desired, between the opening and the closing of the switches to pass from one stable combination to another. The control device 120, in particular, has been configured to open a switch for a switching arm slightly before the other switch on said switching arm is closed. In this way both switches for the same switching arm are open at the same time for a short transitory moment, called a between-cycle time. This allows the event in which both switches are closed at the same time, and thus the battery 102 being shorted out, to be avoided. Thus, within the framework of the present invention, stable combinations of switches may be separated from each other by between-cycle times during which the two switches for one same arm are open. The stable switch combinations are held for at least 2-3 µs in general, when the cut-off frequency is approximately 10 kHz, for example at least 10 µs, whereas the transitory combinations last less than 2-3 µs.

Figure 3:
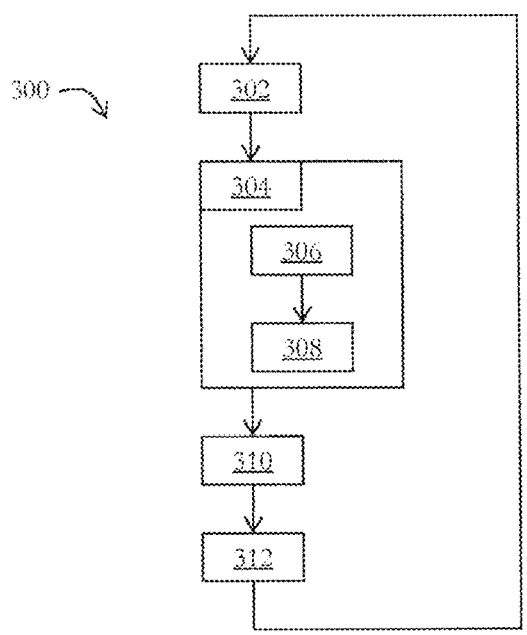
FIG. 3 is a block diagram that illustrates the steps for an inverter control procedure that uses the invention.

An operating procedure 300 for the electrical installation 100 shall now be described with reference to FIG. 3.

During Step 302, the processing unit 122 receives phase voltage setpoints U*, V* and W* for an operating period for the engine 104. The period of time corresponds to a predetermined angle sector for the rotation of the rotor of the engine 104, for example. The phase voltage setpoints U*, V* and W* form a setpoint vector M* in the vector space Esp of phase voltages U, V and W. For example, the control device 118 receives phase voltage setpoints U*=½, V*=−1 and W*=½, forming the setpoint vector M*=(½, −1, ½).

During Step 304, the processing unit 122 selects four statuses of the inverter 112, respectively associated with the four predetermined vectors M1-M27 that define a volume in the vector space Esp, which contains the setpoint vector M*.

In the example described, Step 304 comprises a Step 306 during which the processing unit 122 selects the T1-T48 group of predetermined vectors from the memory 120, with said group comprising predetermined vectors that form a volume containing the setpoint vector M*. For example, for the setpoint vector M*=(½, −1, ½), the processing unit 122 selects the predetermined vector group T9 which comprises predetermined vectors M14, M11, M12 and M20. In this example, the setpoint vector M* is located on the face defined by predetermined vectors M14, M12 and M20 and, more specifically, on the segment defined by predetermined vectors M12 and M20. It shall be noted that the processing unit 122 could have selected the group T10 of predetermined vectors, which comprises predetermined vectors M14, M12, M21 and M20.

In the example described, Step 304 further comprises a Step 308 during which the processing unit 122 selects a status of the inverter 112 associated with said predetermined vector in the memory 120 for each predetermined vector of the predetermined vector group selected. The status selected shall preferably not always be the same for each predetermined vector M1-M27. It shall change to each predetermined multiple of revolutions of the engine 104 (with it being possible for the multiple to be a fraction), for example. The status selected for one predetermined vector M1-M27 changes on every revolution or every two revolutions of the engine or every half revolution of engine rotor 104, for example.

During Step 310, the processing unit 122 determines cyclic ratios for each of the predetermined vectors of the predetermined vector group selected. The cyclic ratios are determined in such a way that the barycentre of the predetermined vectors, weighted based on these cyclic ratios, substantially returns the setpoint vector M*. In the example of the setpoint vector M*=(½, −1, ½), the processing unit 122 allocates a cyclic ratio of 50% to each of the predetermined vectors M12 and M20 and a cyclic ratio of 0% to each of the predetermined vectors M14 and M11. In fact: M*=(½, −1, ½)=50%×M12+50%×M20=50%×(1, −1, 0)+50%×(0, −1, 1).

During Step 312, the processing unit 122 controls the inverter 112 over the period of time, to place the inverter 112 successively in the statuses selected, based on the cyclic ratios determined, so that the inverter substantially applies phase voltage setpoints U*, V* and W* to phases 106, 108 and 110 of the engine 104 respectively, on average over the period of time. The processing unit 122 places the switches in the corresponding statuses to obtain the desired status of the inverter 112. It shall be noted that the inverter 112 may be controlled to support the statuses selected several times. In the example of the setpoint vector M*=(½, −1, ½), the processing unit 122 may place the inverter 112 in the status that returns the predetermined vector M12 for 25% of the period of time, then in the status that returns the predetermined vector M20 for 25% of the period of time, then again in the status that returns the predetermined vector M12 for 25% of the period of time and then again in the status that returns the predetermined vector M20 for 25% of the period of time. Furthermore, it shall be noted that the processing unit 112 preferably causes the statuses of the inverter 112, selected according to an optimal sequence to be switched successively, in which sequence the passage from one status to the next only requires minimal switching of the switches.

The procedure then goes back to Step 302 for the next period of time.

Figure 4:
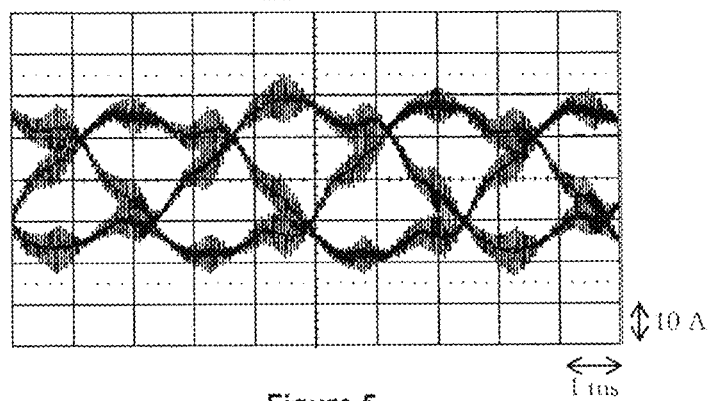
FIG. 4 is a chronogram of the phase currents in an electric engine powered by an inverter that is controlled according to a prior art method.

FIG. 4 is a chronogram of the phase currents in an electric engine powered by an inverter, controlled according to a prior art method for 3-Level Intersective MLI.

Figure 5:
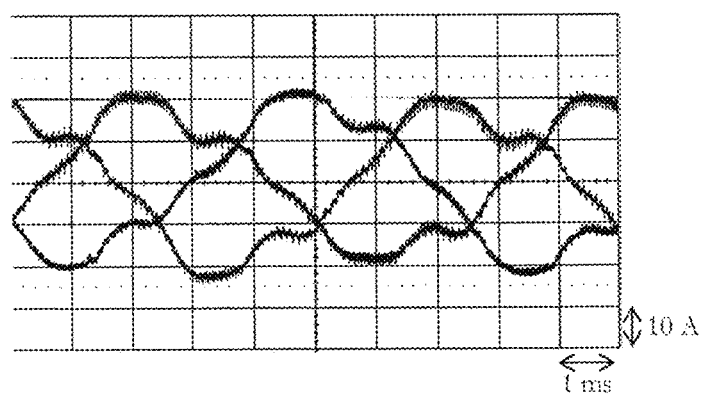
FIG. 5 is a chronogram of the phase currents in an electric engine powered by an inverter controlled according to the invention.

FIG. 5 is a chronogram of the phase currents in an electric engine powered by an inverter, controlled by a control device according to the invention. As can be seen by comparing FIGS. 4 and 5, the invention allows the reduction of the untimely current peaks that come from the use of homopolar component voltage parasites in the prior art method.

This invention is not restricted to the embodiment described above, but is rather defined by the claims below. It would effectively be apparent to the person skilled in the art that changes may be made to same.

The invention may, in particular, be easily adapted to an inverter for a N-phase engine. In such a case, the engine phase space Esp has a dimension N. In such a space, the volume is defined by N+1 vectors.

Moreover, the groups of the inverter statuses may comprise more than N+1 statuses. In such a case, these statuses shall be associated with predetermined vectors that define a volume other than a tetrahedron.

Moreover, the battery 102 may be replaced by another source of direct voltage.

What is more, the terms used in the claims must not be understood to be restricted to the embodiment items described above, but must, in contrast, be understood to cover all the equivalent items that the person skilled in the art may deduce from their general knowledge.

The invention claimed is:

1. A control device for an inverter to be connected to an engine with N phases, respectively configured to receive N phase voltages, with the N phase voltages defining a vector space of which each phase voltage forms a dimension, with N being greater than or equal to three, the inverter being designed to support several statuses in each of which it is designed to apply the predetermined phase voltages to the phases of the engine, with the predetermined phase voltages of each status of the inverter forming a predetermined vector in the vector space, with the control device being configured to:

receive the phase voltage setpoints that form a setpoint vector in the vector space, for a period of time, select at least N+1 statuses of the inverter respectively associated with at least N+1 predetermined vectors that define a volume in the vector space which contains the setpoint vector, control the inverter, over the period of time, to place it successively in the statuses selected, so that it substantially applies the phase voltage setpoints on average over the period of time, the control device being wherein the at least N+1 statuses of the inverter are selected from groups of at least N+1 statuses of inverter, with the at least N+1 statuses of inverter for at least one of the groups being respectively associated with at least N+1 predetermined vectors of which at least N are formed by the predetermined zero sum phase voltages and of which at least one is formed by the non-zero sum predetermined phase voltages.

2. The control device according to claim 1, in which each group comprises a status of the inverter associated with the zero vector in the vector space for which the predetermined phase voltages are all zero.

3. The control device according to claim 2, in which the volumes defined by the predetermined vectors associated with the statuses of the inverter of the groups do not overlap.

4. The control device according to claim 3, in which each group of the statuses of the inverter comprises exactly N+1 statuses of the inverter.

5. The control device according to claim 3, in which at least one group of the statuses of the inverter comprises exactly N−1 statuses, respectively associated with N−1 predetermined vectors, each of which is formed from the predetermined phase voltages and the sum of which is zero.

6. The control device according to claim 2, in which each group of the statuses of the inverter comprises exactly N+1 statuses of the inverter.

7. The control device according to claim 2, in which at least one group of the statuses of the inverter comprises exactly N−1 statuses, respectively associated with N−1 predetermined vectors, each of which is formed from the predetermined phase voltages and the sum of which is zero.

8. The control device according to claim 2, in which N is three.

9. The control device according to claim 1, in which the volumes defined by the predetermined vectors associated with the statuses of the inverter of the groups do not overlap.

10. The control device according to claim 9, in which each group of the statuses of the inverter comprises exactly N+1 statuses of the inverter.

11. The control device according to claim 9, in which at least one group of the statuses of the inverter comprises exactly N−1 statuses, respectively associated with N−1 predetermined vectors, each of which is formed from the predetermined phase voltages and the sum of which is zero.

12. The control device according to claim 1, in which each group of the statuses of the inverter comprises exactly N+1 statuses of the inverter.

13. The control device according to claim 12, in which N is three.

14. The control device according to claim 1, in which at least one group of the statuses of the inverter comprises exactly N−1 statuses, respectively associated with N−1 predetermined vectors, each of which is formed from the predetermined phase voltages and the sum of which is zero.

15. The control device according to claim 14, in which N is three.

16. The control device according to claim 1, in which N is three.

17. An electrical installation comprising the following:

an inverter to be connected to an engine with N phases, respectively configured to receive N phase voltages, with the N phase voltages defining a vector space of which each phase voltage forms a dimension, with N being greater than or equal to three and the inverter being designed to support several statuses in each of which it is designed to apply the predetermined phase voltages to the phases of the engine, with the predetermined phase voltages of each status of the inverter forming a predetermined vector in the vector space, a control device for the inverter, said control device being configured to:

receive the phase voltage setpoints that form a setpoint vector in the vector space, for a period of time, select at least N+1 statuses of the inverter respectively associated with at least N+1 predetermined vectors that define a volume in the vector space which contains the setpoint vector, control the inverter, over the period of time, to place it successively in the statuses selected, so that it substantially applies the phase voltage setpoints on average over the period of time, the control device being wherein the at least N+1 statuses of the inverter are selected from groups of at least N+1 statuses of inverter, with the at least N+1 statuses of inverter for at least one of the groups being respectively associated with at least N+1 predetermined vectors of which at least N are formed by the predetermined zero sum phase voltages and of which at least one is formed by the non-zero sum predetermined phase voltages.

18. The electrical installation according to claim 17, in which the inverter comprises the following:

a first terminal and a second terminal between which a continuous voltage is to be applied, for each end of phase, a switching arm comprising two switches connected to each other at a mid-point to which the end of phase concerned is configured to be connected, with a first switch being connected to the first terminal and the second switch being connected to the second terminal, with each switch being designed to support an open status and a closed status, and each status of the inverter being defined by a combination of switch statuses.

19. A control procedure for an inverter to be connected to an engine with N phases, respectively configured to receive N phase voltages, with the N phase voltages defining a vector space of which each phase voltage forms a dimension, with N being greater than or equal to three and the inverter being designed to support several statuses in each of which it is designed to apply the predetermined phase voltages to the phases of the engine, with the predetermined phase voltages of each status of the inverter forming a predetermined vector in the vector space, with the control procedure comprising the following:

receiving the phase voltage setpoints that form a setpoint vector in the vector space for a period of time, selecting at least N+1 statuses of the inverter respectively associated with at least N+1 predetermined vectors that define a volume in the vector space which contains the setpoint vector, controlling the inverter over the period of time to place it successively in the statuses selected, so that it substantially applies the phase voltage setpoints on average over the period of time, with the control procedure being wherein the at least N+1 statuses of the inverter are selected from groups of at least N+1 statuses of the inverter, with the at least N+1 statuses of the inverter for at least one of the groups being respectively associated with at least N+1 predetermined vectors of which at least N are formed by the predetermined zero sum phase voltages and of which at least one is formed by the non-zero sum predetermined phase voltages.

20. A computer program that can be downloaded from a communication network and/or recorded on a data carrier that can be read by a computer, wherein the computer program comprises the instructions for the implementation of the steps for a procedure according to claim 19, when the computer programme is run by a computer.

\* \* \* \* \*